United States Patent
Kikuchi et al.

(10) Patent No.: US 6,934,429 B2
(45) Date of Patent: Aug. 23, 2005

(54) OPTICAL WAVEGUIDE BOARD AND OPTICAL MODULE

(75) Inventors: Hideo Kikuchi, Tokyo (JP); Junichi Sasaki, Tokyo (JP); Seiji Suda, Tokyo (JP); Mikio Oda, Tokyo (JP); Hikaru Kouta, Tokyo (JP); Sakae Kitajo, Tokyo (JP); Yuzo Shimada, Tokyo (JP)

(73) Assignee: NEC Corporation, Tokyo (JP)

( * ) Notice: Subject to any disclaimer, the term of this patent is extended or adjusted under 35 U.S.C. 154(b) by 169 days.

(21) Appl. No.: 10/285,647

(22) Filed: Nov. 1, 2002

(65) Prior Publication Data

US 2003/0142896 A1 Jul. 31, 2003

(30) Foreign Application Priority Data

Nov. 1, 2001 (JP) ......................................... 2001-337044

(51) Int. Cl.[7] ................................................. G02B 6/12
(52) U.S. Cl. .......................................... 385/14; 385/129
(58) Field of Search .............................. 385/14, 26–28, 385/129–131, 38, 116, 119

(56) References Cited

U.S. PATENT DOCUMENTS 6,516,115 B1 * 2/2003 Fujita et al. .................. 385/31
6,625,352 B2 * 9/2003 Chang .......................... 385/33

FOREIGN PATENT DOCUMENTS

| JP | S59-166219 A | 11/1984 |
|----|----|----|
| JP | 7-120629 A | 5/1995 |
| JP | H11-326662 A | 11/1999 |
| JP | 2000-29531 A | 2/2000 |
| JP | 2000-111754 A | 4/2000 |
| JP | 2000-241672 A | 9/2000 |
| JP | 2000-141965 A | 5/2001 |
| JP | 2001-174671 A | 6/2001 |

* cited by examiner

Primary Examiner—Diane I. Lee
Assistant Examiner—Lisa M. Caputo
(74) Attorney, Agent, or Firm—Sughrue Mion, PLLC

(57) ABSTRACT

An optical waveguide board is provided which includes a substrate, an optical path changing unit being formed on the substrate used to change a direction of an optical path of incident light from a direction being vertical to a surface of the substrate to a direction being horizontal to the surface of the substrate and to condense a luminous flux and an optical waveguide being formed on the substrate to carry out multi-mode transmission of a luminous flux fed from the optical path changing unit wherein, based on a spread angle of the luminous flux formed by the optical path changing unit, mainly light components to be transmitted in a zero-order mode to a three-order mode only, out of various kinds of modes for the multi-mode transmission, is transmitted through the optical waveguide.

16 Claims, 9 Drawing Sheets

11:laser luminous flux

OPTICAL WAVEGUIDE BOARD AND OPTICAL MODULE

BACKGROUND OF THE INVENTION

1. Field of the Invention

The present invention relates to an optical waveguide board and an optical module and more particularly to the optical waveguide board and the optical module to be used for multi-mode optical transmission.

The present invention claims priority of Japanese Patent Application No. 2001-337044 filed on Nov. 1, 2001, which is hereby incorporated by reference.

2. Description of the Related Art

Recently optical communication technology using light as an information transmission medium has become widely used. In such optical communication technology, in order to transmit signal light, an optical waveguide board having an optical waveguide formed on a substrate is employed in which signal light is transmitted along the optical waveguide. The optical waveguide is configured so that its core layer having a high refractive index is surrounded by its clad layer having a low refractive index. Signal light having been incident on one end of the optical waveguide at an angle larger than a critical angle is totally reflected at a boundary between the core layer and clad layer such that the signal light is confined within the core layer and propagates along a direction of a length of the core layer and is then output from another end of the optical waveguide. To perform such an optical transmission, a multi-mode optical transmission system is employed which is adapted to transmit light signal made up of multi-order light.

While such a multi-mode transmission is carried out, signal light travels while in being repeatedly totally reflected at the boundary between the core layer and clad layer at a large angle therefor the number of times the reflection is repeated per unit distance is increased compared with a case of a low-order mode transmission and, as a result, transmission speed is limited causing an increase in transmission loss and a decreased output of outgoing light. To solve this problem, an optical waveguide board (optical signal transmission system) is disclosed in, for example, Japanese Patent Application Laid-open No. 2000-39531. The disclosed optical waveguide board is configured so that, by forming a curved convex surface portion at an end face of an optical waveguide on which signal light is incident, as shown in FIG. 19A, signal light 51 is converted into parallel light by lens effects of the curved convex surface portion and is made incident into a core layer 52. By constructing the optical waveguide as above, since only zero-order-mode signal light can be output as parallel light, the intensity of the outgoing light becomes high, which enables a decrease in light output to be avoided.

However, the above disclosed conventional optical waveguide board has a problem in that, if the parallel light being incident on a incident end of the optical waveguide is inclined in its incident direction, since high-order-mode signal light corresponding to this inclination is transmitted, transmission characteristics of the signal light are changed. That is, as shown in FIG. 19B, if the parallel signal light 51 is incident on an incident end of the core layer 52 with an inclination of an angle G, high-order-mode signal light corresponding to the inclination of the angle G is transmitted, and the intensity of the output zero-order-mode signal light is low. When optical modulating or optical switching processing is performed, zero-order-mode signal light is used. However, as described above, since the intensity of the zero-order-mode signal light is low, variation in transmission characteristics of signal light becomes unavoidable.

SUMMARY OF THE INVENTION

In view of the above, it is an object of the present invention to provide an optical waveguide board and an optical module which are capable of stabilizing transmission characteristics of signal light traveling through an optical waveguide.

According to a first aspect of the present invention, there is provided an optical waveguide board including:

a substrate;

an optical path changing unit being formed on the substrate used to change a direction of an optical path of incident light from a direction being vertical to a surface of the substrate to a direction being horizontal to the surface of the substrate and to condense a luminous flux;

an optical waveguide being formed on the substrate used to carry out multi-mode transmission of a luminous flux fed from the optical path changing unit; and wherein, based on a spread angle of the luminous flux formed by the optical path changing unit, mainly light components to be transmitted in a zero-order mode to a three-order mode only, out of various kinds of modes for the multi-mode transmission, is transmitted through the optical waveguide.

In the foregoing, a preferable mode is one wherein the optical path changing unit is constructed of an insulator having a surface of a spheroid and on the surface of the spheroid is formed a concave mirror made up of a metal film.

Also, a preferable mode is one wherein an adhesive is filled between the optical path changing unit and the optical waveguide.

Also, a preferable mode is one wherein the adhesive has almost a same refractive index as that of a core layer making up the optical waveguide.

Also, a preferable mode is one wherein the optical path changing unit is made up of an insulator and on a surface of the insulator on a side of the optical waveguide is formed a plurality of spherical surfaces corresponding to a plurality of the optical waveguides being placed in parallel to one another.

Also, a preferable mode is one wherein the optical path changing unit is made up of an insulator and on an upper surface of the insulator is formed a plurality of spherical surfaces corresponding to a plurality of the optical waveguides being placed in parallel to one another.

Also, a preferable mode is one wherein the optical path changing unit is made up of an insulator and an upper surface of the insulator is arranged in a manner so as to be inclined relative to the substrate and wherein a spherical surface is formed on a light outgoing surface of the insulator.

Also, a preferable mode is one wherein the optical path changing unit is made up of an insulator and on a side of the light source of the insulator is formed a first curved surface on which light is incident from the light source and on a side of the optical waveguide of the insulator is formed a second curved surface used to output light reflected on a plane mirror existing under a lower surface of the insulator, so that the output light enters into the optical waveguide.

According to a second aspect of the present invention, there is provided an optical waveguide board including a multi-mode optical waveguide formed on a substrate used to receive and transmit light wherein, when an angle of deviation of an optical path entering into the optical waveguide is a spread half angle of light to be transmitted in a zero-order mode, a luminous flux fed from the optical path is formed by a light condensing unit so as to have a spread half angle being about two times or more larger than the angle of deviation of the optical path and the spread half angle of the luminous flux is set to be less than 2.4 degrees.

According to a third aspect of the present invention, there is provided an optical waveguide board including a light condensing unit to reflect a plurality of luminous fluxes incident from a plurality of light sources in a direction almost perpendicular to an incident direction and condense the a plurality of reflected luminous fluxes, the light condensing unit being so configured as to apply light from a direction being inclined to be directed toward a direction of an optical path to an optical waveguide in which a light incident surface being inclined relative to a direction of the optical path within a surface of a substrate in which the optical waveguide is made up of a plurality of optical waveguide components.

In the foregoing, a preferable mode is one wherein the light condensing unit has a structure such that a light beam traveling in parallel to the substrate is incident from an outside of an insulator, is reflected totally off an upper surface of the insulator and directed to a mirror being placed under a lower surface of the insulator, is reflected off the mirror and then directed to an upper surface of the insulator, is refracted on an upper surface of the insulator and is finally condensed on a convex surface formed on a light outgoing surface of the insulator.

Also, a preferable mode is one wherein the light condensing unit has a function of having a light beam in the optical path travel in a reverse direction.

According to a fourth aspect of the present invention, there is provided an optical module including:

a light source and an optical waveguide board including:

a substrate;

an optical path changing unit being formed on the substrate used to change a direction of an optical path of incident light from a direction being vertical to a surface of the substrate to a direction being horizontal to the surface of the substrate and to condense a luminous flux;

an optical waveguide being formed on the substrate to carry out multi-mode transmission of the luminous flux fed from the optical path changing unit; and wherein, based on a spread angle of the luminous flux formed by the optical path changing unit, mainly light components to be transmitted in a zero-order mode to a three-order mode only, out of various kinds of modes for the multi-mode transmission, is transmitted through the optical waveguide.

According to a fifth aspect of the present invention, there is provided an optical module including:

a light source made up of a surface light emitting device used to deflect a luminous flux in a specified direction, and an optical waveguide board wherein a multi-mode optical waveguide used to receive and transmit light fed from the light source is formed on a substrate and, when an angle of deviation of an optical path entering into the optical waveguide is a spread half angle of light to be transmitted in a zero-order mode, aluminous flux fed from the optical path is formed by a light condensing unit so as to have a spread half angle being about two times or more larger than the angle of deviation of the optical path and the spread half angle of the luminous flux is set to be less than 2.4 degrees and wherein calibration is made by the light condensing unit so that an angular deviation in the optical path of a luminous flux entering into the optical waveguide relative to a direction in which light is transmitted in a zero-order mode in the optical waveguide is made smaller.

According to a sixth aspect of the present invention, there is provided an optical module including a light source and an optical waveguide board wherein a multi-mode optical waveguide used to receive and transmit light fed from the light source is formed on a substrate and, when an angle of deviation of an optical path entering into the optical waveguide is a spread half angle of light to be transmitted in a zero-order mode, a luminous flux fed from the optical path is formed by a light condensing unit so as to have a spread half angle being about two times or more larger than the angle of deviation of the optical path and the spread half angle of the luminous flux is set to be less than 2.4 degrees and wherein an optical path calibrating unit having a focusing distance being larger than that being used when an optical path is made smaller by the light condensing unit is placed between the light source and the light condensing unit and the optical path calibrating unit is so configured as to be movable in parallel to a surface of the optical waveguide board and wherein calibration is made by the light condensing unit so that an angular deviation in the optical path of a luminous flux entering into the optical waveguide relative to a direction in which light is transmitted in a zero-order mode in the optical waveguide is made smaller.

According to a seventh aspect of the present invention, there is provided an optical module including:

a plurality of light sources and an optical waveguide board wherein a light condensing unit to reflect a plurality of luminous fluxes incident from the plurality of light sources in a direction almost perpendicular to an incident direction and condense the a plurality of reflected luminous fluxes, the light condensing unit being so configured as to apply light from a direction being inclined to be directed toward an optical path to an optical waveguide in which a light incident surface being inclined relative to the optical path within a surface of a substrate in which the optical waveguide is made up of optical waveguide components.

With the above configurations of the optical waveguide board and optical module of the present invention, since luminous fluxes being incident into the optical waveguide for multi-mode transmission include mainly a light component to be transmitted in a zero-order mode (that is, number of orders of a transmission mode is 0) to in a three-order mode (that is, number of orders of the transmission mode is 3) only, out of light components for multi-mode transmission and thus the number of orders of the transmission modes is small, signal light can be transmitted in a mode being similar to a single mode, which makes it possible to transmit signal light at a high velocity. Therefore, it is possible to stabilize transmission characteristics of signal light traveling through the optical waveguide.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
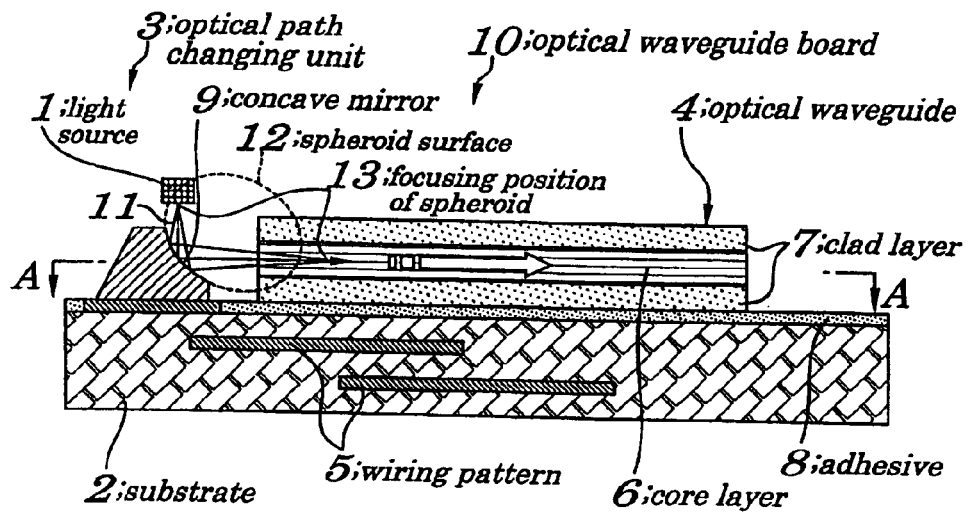
FIG. 1 is a side view showing configurations of an optical module (optical waveguide board) according to a first embodiment of the present invention.
Figure 2:
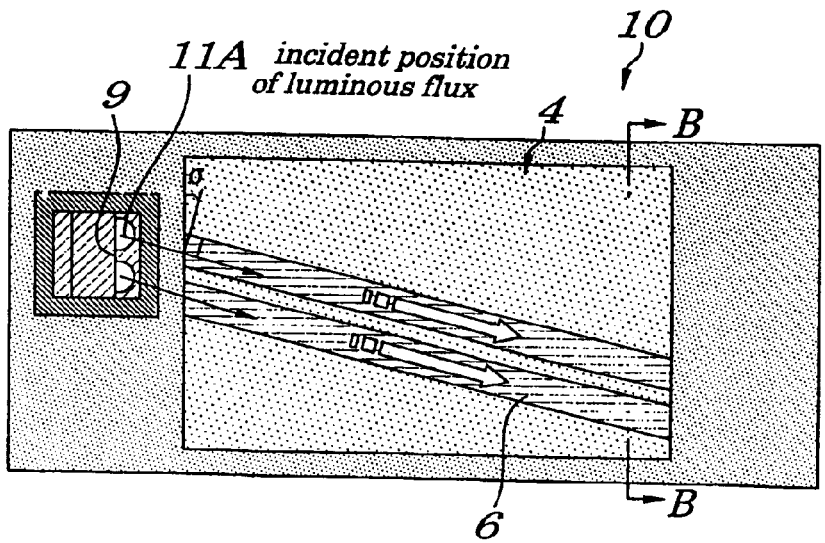
FIG. 2 is a cross-sectional view of the optical waveguide board of FIG. 1 taken along a line A—A.
Figure 3:
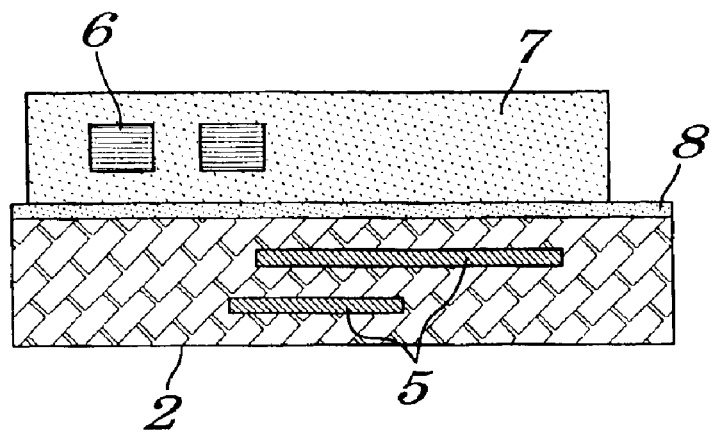
FIG. 3 is a cross-sectional view of the optical waveguide board of FIG. 2 taken along a line B—B.
Figure 4:
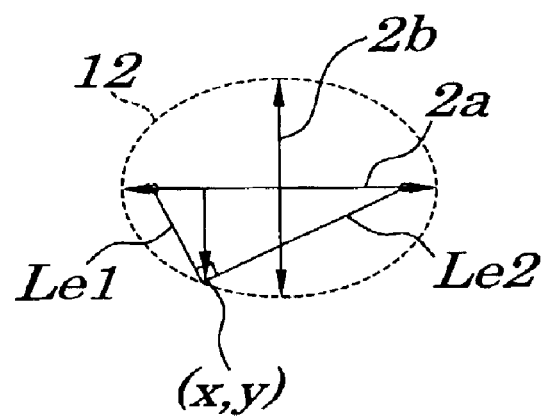
FIG. 4 is a diagram explaining principles of the optical module (optical waveguide board) according to the first embodiment of the present invention.
Figure 5:
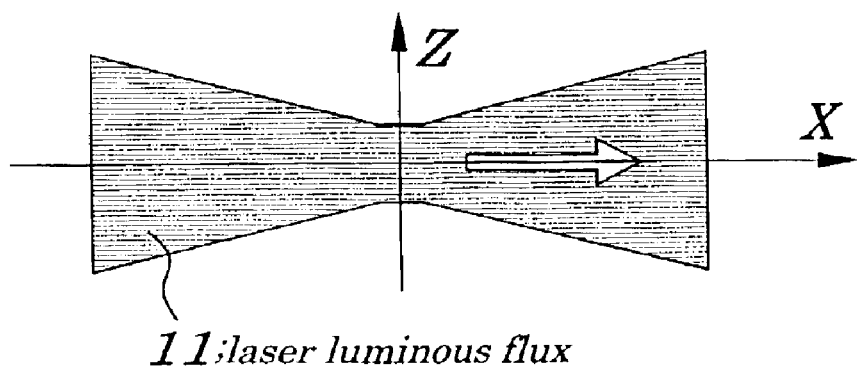
FIG. 5 is a diagram showing an outline of a method for designing a concave mirror for the optical waveguide board according to the first embodiment of the present invention.
Figure 6:
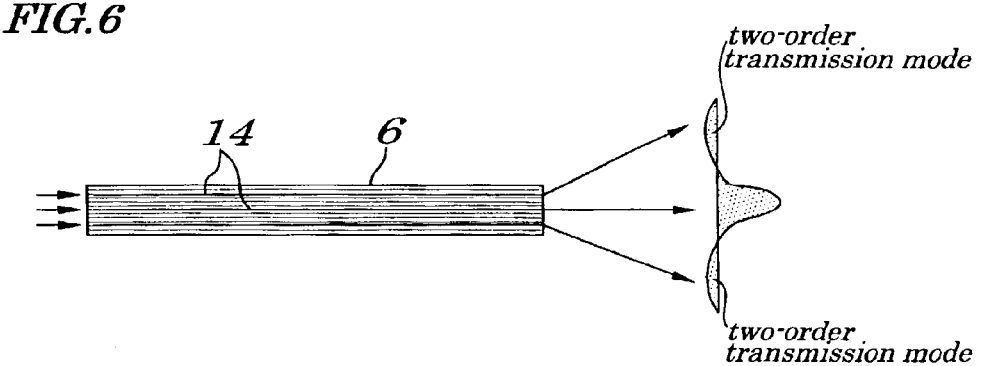
FIG. 6 is a diagram explaining operations of the optical module (optical waveguide board) according to the first embodiment of the present invention.

FIG. 1 is a side view showing configurations of an optical module (optical waveguide board) according to a first embodiment of the present invention. FIG. 2 is a cross-sectional view of the optical waveguide board of FIG. 1 taken along a line A—A. FIG. 3 is a cross-sectional view of the optical waveguide board of FIG. 2 taken along a line B—B. FIG. 4 is a diagram explaining principles of the optical module (optical waveguide board) according to the first embodiment. FIG. 5 is a diagram showing an outline of a method for designing a concave mirror for the optical waveguide board according to the first embodiment. FIG. 6 is a diagram explaining operations of the optical waveguide board according to the first embodiment.

The optical module of the first embodiment, as shown in FIG. 1 to FIG. 3, chiefly includes a light source 1 and an optical waveguide board 10. The optical waveguide board 10 is made up of a substrate 2, an optical path changing unit 3 being formed on the substrate 2 used to change a direction of an optical path of incident light from a direction being vertical to a surface of the substrate 2 to a direction being horizontal to the surface of the substrate 2 and to condense a luminous flux 11, and an optical waveguide 4 being formed on the substrate 2 used to carry out multi-mode transmission of the luminous flux 11 fed from the optical path changing unit 3. As the optical source 1, for example, a laser diode, a single-mode optical fiber, or another metal is used. As the substrate 2, a glass epoxy substrate, ceramic substrate, or silicon substrate, all with a wiring pattern 5 made of copper or a like being internally formed therein, is employed. The optical path changing unit 3 is made of, for example, a resin body, whose surface is formed so as to provide a spheroid surface 12 and further a concave mirror 9 is formed, by metal plating, on a curved surface of the spheroid surface 12. The optical waveguide 4 is made of, for example, two kinds of organic resins in which a core layer 6 having a high refractive index is surrounded by a clad layer 7 having a low refractive index. The optical waveguide 4 is adhered to the substrate 2 using an adhesive 8. Also, a focusing position 13 of the spheroid 13 incident position 11A of the luminous flux 11 are shown in FIG. 1 and FIG. 2 respectively. The optical waveguide 4 is constructed in a manner that the core layer 6 made of an organic resin having a high refractive index and wrapped/sandwiched, in advance, by the clad layer 7 made of an organic resin having a low refractive index and then the core layer 6 being wrapped/sandwiched by the clad layer 7 is fixed on the substrate 2 by the adhesive 8. The optical waveguide 4 may be configured in another manner that, after a lower clad layer 7 made of an organic resin having a low refractive index is fixed on the substrate 2 using the adhesive 8, the core layer 6 made of an organic resin having a high refractive index is fixed on the lower clad layer 7 and then the core layer 6 is covered with an upper clad layer 7 made of an organic resin having a high refractive index so that the core layer 6 is wrapped by the lower and upper portions of the clad layers 7. Also, the optical waveguide 4 may be also configured in still another manner that the core layer 6 made of silica glass being wrapped by the clad layer 7 made of silica glass is fixed on the substrate 2 using the adhesive 8 or the core layer 6 made of an optic fiber being wrapped by the clad layer 7 made of an optic fiber is fixed on the substrate 2 using the adhesive 8.

The concave mirror 9 in the optical path changing unit 3 serves as a reflection face adapted to reflect light being incident from the light source 1 and to change a direction of the light being incident in a direction being vertical to a surface of the substrate 2 to a direction being horizontal to the surface of the substrate 2 and to condense the luminous flux 11. The concave mirror 9 serving as the reflection face of light is configured to have a spheroid surface. However, the concave mirror 9 may be configured to have a spherical surface, or a non-spherical surface instead of the spheroid surface. Materials for metal plating applied to the concave mirror 9 include, for example, copper, nickel, gold, or a like, which are used, as appropriate, for the metal plating in combination.

Next, configurations of the an optical waveguide board 10 employed in the first embodiment will be described in detail.

(1) As the light source 1, for example, a laser diode is used. A laser luminous flux 11 is emitted from a region having a diameter d=10 μm and a beam waist is made to exist at a position where the laser luminous flux is emitted.

(2) A multi-mode transmission type of optical waveguide 4 is used which has the core layer 6 of which thickness "t" is 50 μm.

Here, a transmission mode of light is calculated as follows. The transmission mode of the optical waveguide 4, while light is incident on the core layer 6 of the optical waveguide 4 at an incident angle "θ" relative to an axis line of the core layer 6 and is transmitted repeating total reflection at an angle being more than a critical angle θC, is formed under a condition that a sum of values of phase changes in a direction X of a length of the core layer 6 becomes 2 πm (however, the number of orders of a transmission mode "m"=0, 1, 2, . . . ). The critical angle "θC" is given by a following equation:

$$\theta C=(\pi/2)-[\sin^{-1}(n2/n1)]\approx(\sin^{-1}(2\Delta)^{1/2})$$

where "Δ" denotes a relative refractive-index difference, "n1" denotes a refractive index of the core layer 6 and "n2" denotes a refractive index of the clad layer 7.

$$\Delta=(n1^2-n2^2)/(2\cdot n1^2)\approx(n1-n2)/n1$$

Moreover, total values of phase changes CH obtained when light having a transmission constant K=2π/λ in a vacuum travels to and back once through a medium in a direction vertical to an optical axis are given by a following equation:

$$CH=(t\cdot n1\cdot K\cdot \sin\theta+\Psi g)\cdot 2$$

where "t" denotes a thickness of the core layer 6, "λ" denotes a wavelength of light in a vacuum, and "Ψg" denotes a Goos-Hänchen's shift value.

Here, when light is transmitted in a transmission mode with the number of orders being "m", an incident angle θ is obtained by a following equation:

$$(t\cdot n1\cdot K\cdot\sin\theta+\Psi g)\cdot 2=2\pi m$$

That is, a following equation (1) is formed for the incident angle "θ".

$$(\pi m-\Psi g)/(t\cdot n1\cdot K)=\sin\theta \quad \text{Equation (1)}$$

The above Goos-Hänchen's shift value Ψg is given by a following equation. (Ψg is 0 (zero) when θ≧θC and is −π when θ=0.)

A following equation is formed for P-polarized light whose electric field direction is in parallel to an incident surface:

$$\tan(\Psi g/2)=-[(\cos\theta)^2\cdot(n1/n2)^4-(n1/n2)^2]^{1/2}/\sin\theta$$

A following equation is formed for S-polarized light whose electric field direction is vertical to an incident face:

$$\tan(\Psi g/2) = -[(\cos\theta)^2 - (n2/n1)^2]^{1/2}/\sin\theta$$
$$= -[(2\Delta)/(\sin\theta)^2 - 1]^{1/2}$$

Here, if a refractive-index difference between n1 and n2 is small, there is almost no difference between S-polarized light and P-polarized light. When the expression for obtaining the Goos-Hänchen's shift value is substituted in Equation (1) in the case of the S-polarized light, a following equation is given.

$$\tan(t\cdot n1\cdot K\cdot\sin\theta/2-\pi m/2)=[(2\Delta)/(\sin\theta)^2-1]^{1/2}$$

Thus, since light wave having an arbitrary transmission angle cannot be transmitted, only light having a discrete transmission angle that satisfy the above equation can be transmitted. Based on the above equations, if ξ=sin θ/(2Δ)$^{1/2}$ (where 0≦ξ≦1) and v=t·n1·K·(2Δ)$^{1/2}$/2, a following equation can be obtained:

$$v=(\cos^{-1}\xi+m\pi/2)/\xi$$

Here, a condition for the optical waveguide 4 to provide a single-mode transmission is that solutions of "m=0" are provided. A condition to satisfy this is that v<π/2. Therefore, a condition for transmission of signal light approximately in a single mode is given by a following equation:

$$\lambda/(2\cdot n1\cdot t)>(2\Delta)^{1/2}=\sin\theta C$$

When n1=1.5, if 1 μm is substituted into "λ" and 50 μm is substituted into "t" as one example, to achieve the single-mode transmission, the above equation shows that a condition of "Δ<0.000022" has to be satisfied. However, it is difficult to actually calibrate such a small refractive index and "Δ=0.003" is generally a relative refractive index difference between n1 and n2 which is being used. Therefore, the condition being "Δ=0.003" is employed. As described above, if a thickness of the core layer 6 with "t"=50 μm, multi-transmission is achieved.

However, in this case, if a light component having a large spread angle does not exist, single-mode transmission is made possible. A limit of a spread half angle Ω1 of the luminous flux 11 in a vacuum that can be transmitted in a single mode can be calculated by a following equation.

$$\Omega 1=\lambda/(2t)$$

If the luminous flux 11 contains only a component having an angle being not more than a spread half angle Ω1, single-mode transmission is performed. As one example, if a wavelength λ is set to be 1 μm and a thickness of the core layer 6 of the optical waveguide 4 is set to be 50 μm, spread half angle Ω1=0.6 degrees=0.01 rad (radian).

By setting the spread half angle (Ω) of the luminous flux 11 being incident on the optical waveguide 4 in a vacuum to be not less than λ/(2t), more higher-order mode transmission of light is made possible. A spread half angle (Ω2) of the luminous flux 11 being formed when a range of a transmittable mode is up to m-order-modes can be given by a following equation (2):

$$\Omega 2=(m+1)\lambda/(2t) \quad \text{Equation (2)}$$

FIG. 5 is a diagram illustrating the laser luminous flux 11 which travels in an X direction and its beam diameter is reduced to a minimum in a position of X=0. A distribution of light intensity I of the laser luminous flux 11 in a position of coordinates (X, Z) in a vacuum is given by a following expression.

$$I\propto\exp[-8\cdot Z^2/\{d^2+(4X\lambda/(\pi d))^2\}]/[(d^2+(4X\lambda/(\pi d))^2)]$$

In the above equation, "d" is called a "minimum beam diameter". In a position of X=0 (being called "position of beam waist") where the luminous flux is condensed to a minimum, the light intensity I in a position of Z=d/2 becomes weak at a rate of exp(−2) to light intensity I in a position of Z=0. Moreover, optical energy in a range of the minimum beam diameter "d" makes up about 95% of the whole optical energy in the position of X=0. The above expression can be expressed by a following expression in a position where Z is sufficiently large.

$$I \propto \exp[-2\{(\pi d/(2\lambda))\cdot Z/X\}^2]/X^2$$

In the above expression, light intensity in a position where a spread half angle Ω3 of optical components contained in a following equation (3) is satisfied becomes weak at a rate of exp(−2) relative to light intensity in a center position of a luminous flux where the X has same value and X=0.

$$\Omega 3 = Z/X = (2\lambda/(\pi d)) \quad \text{Equation (3)}$$

A diameter (Z·2) of the luminous flux 11 obtained in a position up to this point is defined as a diameter of a beam. Moreover, distribution of angles for light intensity of the laser is represented by a function of the spread half angle Ω3=Z/X. Here, a range of a spread angle of the laser light is a Gaussian distribution obtained when a range of angles is approximately the spread half angle Ω3 and a range of a spread angle of signal light to be transmitted in a zero-order mode is represented as a Gaussian distribution obtained when a range of angles is approximately the spread half angle Ω1. If deflection angular deviation "C" exists between a central axis of an incident laser luminous flux 11 and a central axis of zero-order-mode light in the optical waveguide 4, calculation is performed presuming that an amount of energy to be supplied by the laser luminous flux 11 to the zero-order-mode light is proportional to an integral of a product of an angular distribution of the incident light and an angular distribution in the zero-order-mode signal light. As a result, dispersion "R" in amounts of the zero-order-mode light occurring when the directional angular deviation "C" exists in the light to be transmitted is given by a following equation:

$$R = 1 - \exp(-2 \cdot C^2/(\Omega 1^2 + \Omega 3^2))$$

Moreover, if light has a component which is transmitted in an inclined manner from an optical axis of the optical waveguide 4 at an angle Ω2, dispersion "B" in transmission time of light is given by a following equation:

$$B = (1/\cos(\Omega 3) - 1)$$

In the above example, though calculation is made by setting as the spread half angle Ω1=0.6 degrees, a rate of an amount of light using the value of the spread half angle Ω3 and a light transmission speed to be obtained, when there exists 0.6 degrees or so of angular deviation "C" in a direction of the luminous flux 11, are shown in Table 1. Moreover, a number of orders of optical transmission modes of the luminous flux 11 having its spread half angle Ω2 is calculated by the equation (2) and its results are also described together.

TABLE 1

| Thickness of core t | 50 μm | " | " | " |
|---|---|---|---|---|
| Wavelength λ | 1 μm | " | " | " |
| Angular deviation (C) in optical path | 0.6 degrees | " | " | " |
| Spread half angle (Ω3) | 0.6 degrees | 1.2 degrees | 1.8 degrees | 2.4 degrees |

TABLE 1-continued

| Dispersion in amounts of zero-order-mode light (R) | 64% | 33% | 17% | 11% |
|---|---|---|---|---|
| Dispersion in transmission time (B) | 0% | 0.02% | 0.05% | 0.09% |
| Number of orders of maximum transmission mode | Zero-order-mode only | Up to one-order-mode | Up to two-order-mode | Up to three-order-mode |

As is apparent from Table 1, a laser luminous flux 11 incident to the optical waveguide 4, of which a spread half angle Ω3 is within a range from an angle exceeding 1.2 degrees to an angle being less than 2.4 degrees, can reduce the dispersion (R) in amounts of the zero-order-mode light. Moreover, since an amount of the dispersion (B) of the transmission time is less than 0.1%, when light is transmitted through an optical waveguide 4 having a refractive index of about 1.5 and being about 40 cm in length and being placed on a substrate being about 40 cm in length, the transmission time is approximately 2 nano-seconds and the dispersion being within 2 pico-seconds occurs in approximately 0.1% of the amount of the dispersion. Therefore, pulse signals having a frequency of up to about 50 GHz can be transmitted and, as a result, the dispersion of transmission time can be reduced. Thus, it is preferable that the spread half angle Ω3 is confined within about 2.4 degrees. According to the present invention, the laser luminous flux 11 having such the spread angle as above is made incident through the multi-mode optical waveguide 4 having a thickness "t" of a core layer being 50 μm. In this case, zero-order-mode to three-order-mode optical transmission is carried out. A result from the calculation obtained when a thickness "t" of the core layer 6 is set to 100 μm is shown in Table 2 below.

TABLE 2

| Thickness of core t | 100 μm | " | " | " |
|---|---|---|---|---|
| Wavelength λ | 1 μm | " | " | " |
| Angular deviation (C) in optical path | 0.6 degrees | " | " | " |
| Spread half angle (Ω3) | 0.6 degrees | 1.2 degrees | 1.8 degrees | 2.4 degrees |
| Dispersion in amounts of zero-order-mode light (R) | 80% | 38% | 19% | 12% |
| Dispersion in transmission time (B) | 0.005% | 0.02% | 0.05% | 0.09% |
| Number of orders of maximum transmission mode | Zero-order-mode only | Up to three-order-mode | Up to five-order-mode | Up to seven-order-mode |

As is apparent from Table 2, it is preferable that the spread half angle (Ω3) of the laser luminous flux 11 to be incident on the optical waveguide 4 is set to be within a range of 1.2 degrees to 2.4 degrees. Moreover, if the thickness "t" of the core layer is 100 μm, the spread half angle Ω1 becomes 0.3 degrees. However, in a case that angular deviation C in an optical path can be less than 0.6 degrees, for example, within 0.3 degrees, the spread half angle Ω3 of the laser luminous flux 11 to be incident on the optical waveguide 4 can be set to be within a range from 0.6 degrees to 1.2 degrees and the dispersion R in amounts of light to be transmitted in the zero-order mode can be reduced to within a range of 33% to 11%. In this case, it is desirous that the spread half angle Ω3 of the laser luminous flux 11 is set to be within a range from 0.6 degrees to 1.2 degrees.

Since the dispersion R in amounts of the zero-order-mode light is small, a preferable condition can be represented by a following expression:

$\Omega 3 \geq (5C^2 - \Omega 1^2)^{1/2}$

As is apparent from the above expression, in the optical waveguide 4, if the angular deviation C in the optical path is more than the spread half angle $\Omega 1$ of signal light to be transmitted in the zero-order-mode light, it is preferable that the spread half angle $\Omega 3$ of the laser luminous flux 11 to be incident on the optical waveguide 4 is two times or more larger than a range of the angular deviation C.

(3) The concave mirror 9 whose mirror surface is formed by performing metal plating on a concave face on a curved face of a spheroid is employed. As described above and shown in FIG. 1, a reflection face of the concave mirror 9 serving as the optical path changing unit 3 is so configured that light emitted from a focusing position of spheroid 13 on the spheroid surface 12 is reflected off the concave mirror 9 and changes its direction of travel to approximately an orthogonal direction. A designing method of the concave mirror 9 is described below more particularly by referring to FIG. 4. Assuming that a longer diameter of the spheroid 12 is diameter $2a$ and its shorter diameter is diameter $2b$, the focusing position 13 of the spheroid exists in a position of $(a^2-b^2)^{1/2}$ from a center of the spheroid surface 12. The distances Le1 and Le2 from the concave mirror 9 to the focusing position 13 of the spheroid are given by following equations:

$Le1 = [2(a^2-b^2-a(a^2-2b^2)^{1/2})]^{1/2}$  Equation (5a)

$Le2 = [2(a^2-b^2+a(a^2-2b^2)^{1/2})]^{1/2}$  Equation (5b)

Moreover, in FIG. 4, coordinates (x, y) are represented as follows:

$x = -a(a^2-2b^2)^{1/2}/(a^2-b^2)^{1/2}$ $y = -b^2/(a^2-b^2)^{1/2}$

Also, an extension rate L of an image formed by the concave mirror 9 is given by a following equation:

$L = [(a^2-b^2+a(a^2-2b^2)^{1/2})/b^2$

In contrast, the spread angle $\Omega 2$ of the luminous flux 11 becomes smaller at the rate. Moreover, the rate "a/b" has to be always "$2^{1/2}$". On the other hand, if the extension rate L of an image is used, the rate "a/b" is represented by a following equation:

$a/b = (1+L)/(2L)^{1/2}$

According to the present invention, the luminous flux 11 to be incident on the core layer 6 of the optical waveguide 4 is confined by a thickness "t" of the core layer 6, which causes its spread angle to be twice to four times larger than a spread angle of a luminous flux being formed by interference of a parallel luminous flux. To achieve this, a diameter "de" of the light source 1 to be expressed by a following equation using the Equation (3) is used.

$L = d/de = [4/(m+1)\pi]t/de$

A diameter W of a luminous flux thrown on the concave mirror 9, that is, the diameter of the light traveling in a direction vertical to its optical axis can be obtained by substituting the diameter "de" of the light source 1 into the Equation (3) and by multiplying the obtained beam half angle $\Omega$ by the distance contained in the Equations (5a), (5b) and doubling the resulting value. The diameters W obtained through the above calculation correspond to amounts of light up to $1/e^2$. The dimension W can be given by a following equation:

$W = (de^2 + da^2)$  Equation (6)

$da = 4\lambda/(\pi de) \cdot Le1$  Equation (7)

Where "da" denotes a spread of the beam diameter. Here, as a concrete example, presuming that the thickness "t" of the core layer 6 of the optical waveguide 4 is 50 $\mu$m, the diameter "de" of the light source 1 is 10 $\mu$m, and the number of orders of optical transmission mode "m" to be included is 3, according to the Equation (4), it is necessary to set a beam diameter of the laser luminous flux 11 thrown in the optical waveguide 4 so as to make up 32% of the thickness "t" of the core layer 6, that is, to be 16 $\mu$m. To achieve this, the extension rate L is 1.6 (times). In this case, from the calculation, (a/b)=1.45. That is, it is necessary to use the concave mirror 9 which is so configured that it has the spheroid surface 12 whose the longer diameter is 1.45 times longer than its shorter diameter. In this case, by the Equation (5a), (5b) and by the Equation (7), following equations are formed:

$Le1 = 1.1b(Le2 = 1.8b)$ $da = 1.4\lambda b/de$

Here, presuming that de=10 $\mu$m, $\lambda$=0.85 $\mu$m, and b=0.4 mm (a=0.58 mm), a height "Le 1" between the concave mirror 9 and the light source 1=0.44 mm and da=48 $\mu$m.

Thus, according to the Equation (6), the dimension W of the light traveling in a direction vertical to its optical axis is calculated to be 49 $\mu$m and it is necessary that each of a longitudinal dimension, a transverse dimension and a height of the concave mirror 9 is not less than 49 $\mu$m. This means that a space having the dimension of about 100 $\mu$m in each of a longitudinal dimension, a transverse dimension and a height is enough large to house the concave mirror 9. Moreover, in this case, the light source 1 is placed in a position of a distance "Le 1" being 0.44 mm directly above the concave mirror 9, that is, in a first focusing position of the spheroid surface. At this point, the luminous flux 11 is reflected in a horizontal direction off the surface of the concave mirror 9 and is condensed at a position of a distance "Le 2" being 0.72 mm from the surface of the concave mirror 9 in a horizontal direction, that is, at a second focusing position Le 2 of the spheroid surface. In this case, a second focusing distance Le 2 of the concave mirror 9 is 0.72 mm. A beam diameter d in the second focusing position of the spheroid is 16 $\mu$m. The beam diameter of the luminous flux is 49 $\mu$m at the surface of the concave mirror and is condensed to be 16 $\mu$m at the focusing position. Since the thickness "t" of the core layer 6 of the optical waveguide 4 is as large as 50 $\mu$m which is larger than the beam diameter of a luminous flux in any position within the core layer 6, an incident end face of the luminous flux of the optical waveguide 4 may be positioned in any position within the core layer 6. To achieve easy positioning between the concave mirror 9 and the optical waveguide 4, the incident end face of the luminous flux 11 in the optical waveguide 4 is provided in a vicinity of the concave mirror 9.

Moreover, it is preferable that, by using, as a light source, a surface light-emitting device adapted to deflect and output the luminous flux 11, angular deviation C in an optical path for light being incident in the optical waveguide 4 from a direction in which light is transmitted in the zero-order mode in the optical waveguide 4 is calibrated in a finer manner and an incident direction of light being condensed and gathered in the optical waveguide 4 is calibrated by using the concave mirror 9. By operating as above, since the angular deviation C in the optical path can be calibrated in a finer manner, it is possible to set the spread half angle Ω3 of light being incident in the optical waveguide 4 in the finer manner and therefore to reduce a number of modes for transmission of light being incident in the optical waveguide 4. Moreover, in order to have light being incident from a plurality of the light sources 1 be reflected off each of a plurality of the concave mirrors 9 which is formed integrally with each of a plurality of the optical waveguides 4 in a manner corresponding to one another as shown in FIG. 2 and to guide the light into each of the plurality of the optical waveguides 4 being parallel to one another, a following designing method is employed.

That is, as shown in FIG. 2, in order to prevent light reflected off the incident end face of each of the optical waveguides 4 from traveling backward to the optical path, the incident end face of each of the optical waveguides 4 being parallel to one another is so configured as to be inclined by an angle δ being 8 degrees relative to a direction being vertical to the optical path in a pattern of the core layer 6 of each of the optical waveguides 4. On the other hand, each of the incident end faces in each of the optical waveguides 4 is placed so as to be in parallel to an aligning direction of each of the plurality of the concave mirrors 9 and positioning between each of the plurality of the concave mirrors 9 and each of the optical waveguides 4 is performed. To guide light into a direction of an optical path in each of the optical waveguides 4, light being inclined 12 degrees relative to a vertical direction enters into the incident end face of each of the waveguides 4. Such the light being inclined 12 degrees can be obtained by inclining a direction of an axis of the spheroid on a mirror surface of each of the concave mirrors 9 by 12 degrees to direct the light toward a required direction. Also, by setting a direction of the axis of the spheroid on each of the concave mirrors 9 so as to be vertical to an aligning direction of the concave mirrors 9 and by deviating a position of light to be incident on each of the concave mirrors 9 from a focusing position on an incident side of each of the concave mirrors 9, light can be output from each of the concave mirrors 9 in a manner that it is inclined 12 degrees from the optical axis of each of the concave mirrors 9

Thus, according to the embodiment, since light being incident with a lean of 12 degrees from a direction vertical to an incident end face of the optical waveguide 4 is refracted at an incident surface of the incident end face and travels toward a direction of an optical axis of the pattern in the core layer 6 being inclined 8 degrees from a direction vertical to the incident end face, the direction of the optical path can be used as a direction of a core pattern of the optical waveguide 4. Since the incident end face is not vertical to incident light, it is made possible to prevent light reflected off the incident end face from traveling backward to the optical path. Since parallel luminous fluxes 14 being incident in the multi-mode optical waveguide 4, as shown in FIG. 6, include mainly only a light component to be transmitted in a zero-order mode (that is, "m"=0) to a three-order mode (that is, "m"=3) only, out of light components for the multi-mode transmission in the optical waveguide 4 and thus the number of orders of transmission modes is small, signal light can be transmitted in a mode being similar to a single mode. This makes it possible to transmit signal light at a high velocity. Since an angular component of light has spread so as to contain light to be transmitted in a zero to three modes (that is, "m"=0 to 3), that is, to contain light to be transmitted in a mode being higher than the zero-mode, even if deviation exists in a direction of light, a range of spread of an angular component of light includes a direction of light to be transmitted in a zero-order mode to a direction of light to be transmitted in a one-order mode and even when deviation in a direction of light being incident in the optical waveguide 4 occurs, there is no great change in intensity of light to be transmitted in the zero-order mode. Therefore, according to the first embodiment, transmission characteristics of signal light traveling through the optical waveguide 4 can be made stable.

Second Embodiment

Figure 7:
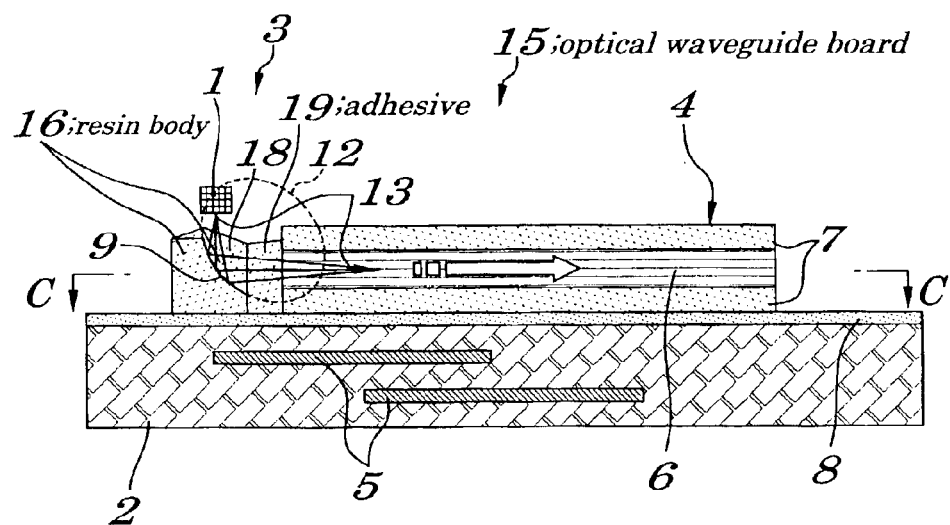
FIG. 7 is a side view showing configurations of an optical module (optical waveguide board) according to a second embodiment of the present invention.
Figure 8:
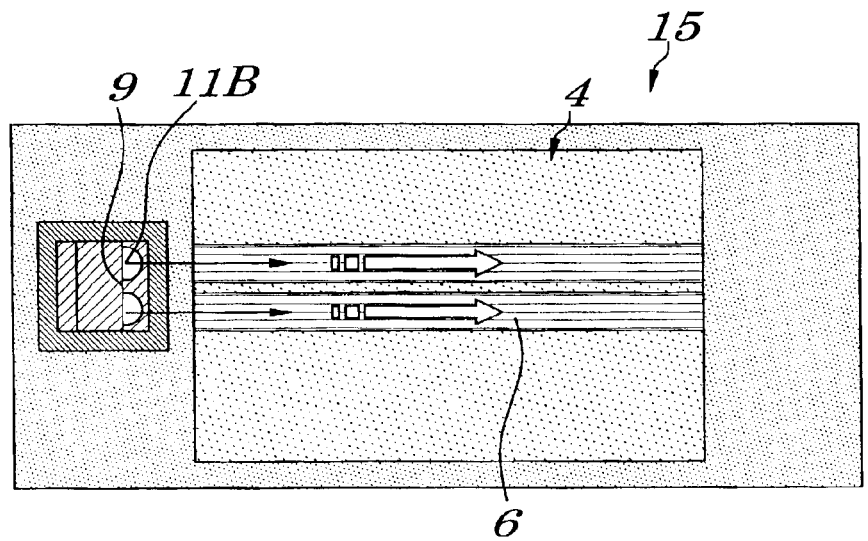
FIG. 8 is a cross-sectional view of the optical waveguide board of FIG. 7 taken along a line C—C.

FIG. 7 is a side view showing configurations of an optical module (optical waveguide board 15) according to a second embodiment of the present invention. FIG. 8 is a cross-sectional view of the optical waveguide board 15 of FIG. 7 taken along a line C—C. Configurations of the optical waveguide board 15 of the second embodiment differ greatly from those in the first embodiment in that an incident surface of a core layer 6 of an optical waveguide 4 is coated with an adhesive 19. In an optical path changing unit 3 of the optical module (optical waveguide board 15), as shown in FIG. 7 and FIG. 8, on a curved surface of a resin body 16 is formed a concave mirror 9 made of a metal film and the concave mirror 9 is coated with an other resin body 18 and an upper surface of the resin body 16 is inclined 5 degrees to 20 degrees relative to a surface of a substrate 2. A purpose of configuring the optical path changing unit 3 as above is to prevent light fed from a light source 1 from traveling backward to the light source 1 after being reflected off a surface of the resin body 16. Moreover, space between the resin body 16 in the optical path changing unit 3 and the optical waveguide 4 is filled with the adhesive 19 having almost the same refractive index as the core layer 6. By coating the incident surface of the optical waveguide 4 with the adhesive 19, since no surface reflection of light occurs, it is not necessary that the incident surface of the optical waveguide 4 is inclined relative to a direction vertical to an optical path. That is, as shown in FIG. 2 in the first embodiment, setting of an angle (δ) is not required.

As described above, since the concave mirror 9 is formed in a manner that the concave mirror 9 is embedded between the two resin bodies 16 and 18, even if the concave mirror 9 is formed by an evaporation method without employing the method of plating of a metal which is required to secure strength of the concave mirror 9, the concave mirror 9 can be protected from damage and therefore the concave mirror 9 can be formed at lower costs. Moreover, in the second embodiment, a spread angle of the light condensed through reflection by the concave mirror 9 and entered into the optical waveguide 4 is so set as to have a spread angle of light to be transmitted in a plurality of optical transmission modes approximately as in the case of the first embodiment. Moreover, in FIG. 7 and FIG. 8, same reference numbers are assigned to each component corresponding to that shown in FIG. 1 and FIG. 2 and their descriptions are omitted accordingly.

Thus, according to the second embodiment, almost the same effects as obtained in the first embodiment can be achieved as well. Additionally, according to the configurations in the second embodiment, since the incident surface of the core layer 6 of the optical waveguide 4 is coated with the adhesive 19 to prevent surface reflection, a process of inclination of the incident surface in the optical waveguide 4 relative to a direction vertical to the optical path is not required.

Third Embodiment

Figure 9:
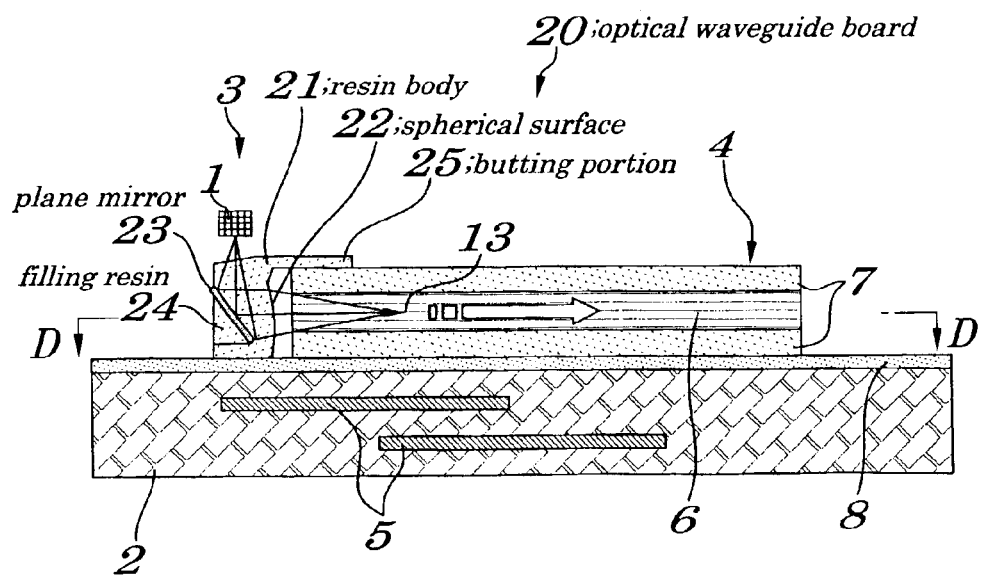
FIG. 9 is a side view showing configurations of an optical module (optical waveguide board according to a third embodiment of the present invention.
Figure 10:
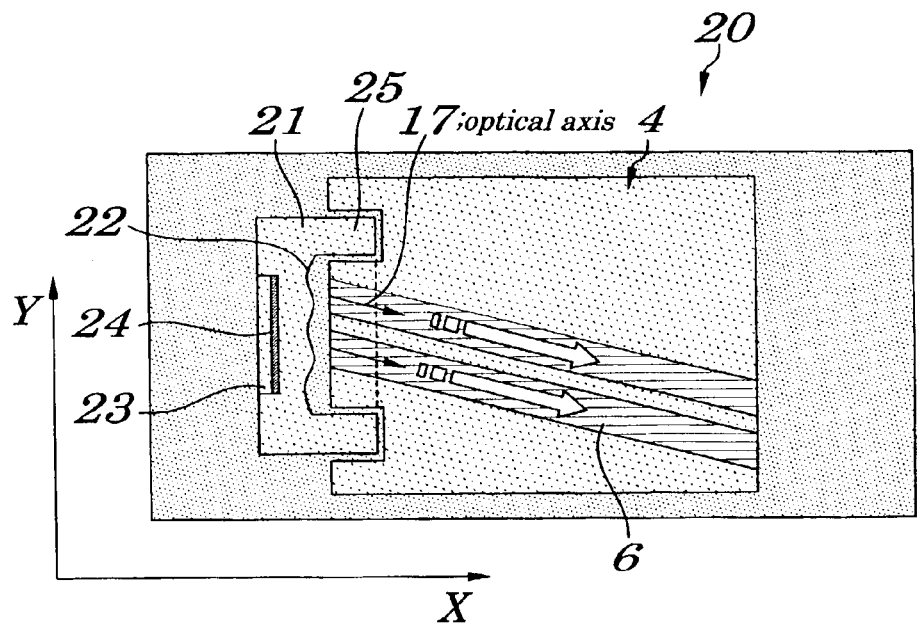
FIG. 10 is a cross-sectional view of the optical waveguide board of FIG. 9 taken along a line D—D.
Figure 11:
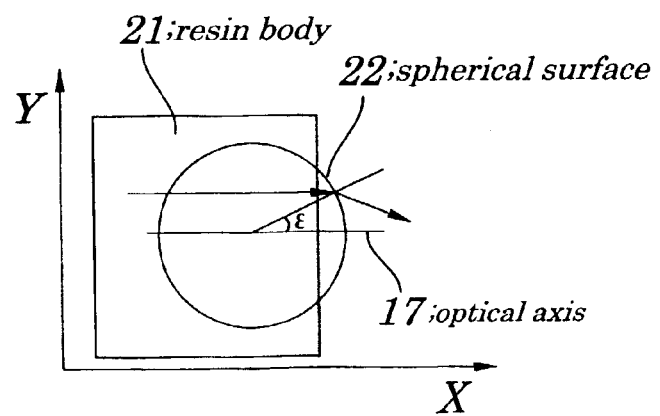
FIG. 11 is a diagram briefly illustrating configurations of a main component of the optical module (optical waveguide board) of the third embodiment of the present invention.

FIG. 9 is a side view showing configurations of an optical module (optical waveguide board 20) according to a third embodiment of the present invention. FIG. 10 is a cross-sectional view of the optical waveguide board 20 of FIG. 9 taken along a line D—D. FIG. 11 is a diagram briefly illustrating configurations of a main component of the optical module (optical waveguide board 20) of the third embodiment. Configurations of the optical waveguide board 20 of the third embodiment differ greatly from those in the first embodiment in that a mirror surface on which a direction of travel of light is changed by an optical path changing unit 3 constructed so as to be plane and a plurality of the optical path changing units 3 are integrally formed and arranged in parallel to one another so that a mirror on which a direction of travel of light is changed is formed on a surface which can be used commonly by the plurality of the optical path changing units 3 and each luminous flux is made to pass through a resin body having a convex spherical surface in a manner that the luminous flux travels through a position being deviated from a central position of the convex spherical surface, thereby causing the luminous flux to enter into an optical waveguide group being constructed so as to be inclined relative to a direction vertical to an incident surface of each of the optical waveguides 4 having an incident surface in a aligning direction of the plurality of the optical path changing units 3.

The optical module (optical waveguide board 20) of the third embodiment, as shown in FIG. 9 and FIG. 10, is so configured that a core layer 6 of each of the optical waveguides 4 has a refractive index being higher by about 0.3% than that of its clad layer 7. Moreover, in the optical path changing unit 3, a resin body 21 being placed in a vicinity of each of the optical waveguides 4 is formed and a surface of the resin body 21 on a side of each of the optical waveguides 4 is formed so as to have a shape of a plurality of spherical surfaces 22 corresponding to a plurality of the optical waveguides 4 being arranged in parallel to one another. On the resin body 21 is formed a plane mirror 23 adapted to reflect light emitted from a light source 1. The plane mirror 23 is used as one surface commonly for the plurality of the optical waveguides 4. The spherical surface 22 makes up a spherical lens. The plane mirror 23 is made up of the resin body 21 coated with metal films obtained by evaporation and a surface of the plane mirror 23 is coated with a filling resin 24. A surface of the resin body 21 is inclined 8 degrees to 20 degrees relative to a substrate 2, which serves to prevent light emitted from the light source 1 from being reflected off a surface of the resin body 21 and from traveling backward to the light source 1. On an upper portion of the resin body 21 is formed a butting portion 25 used to adjust a height of the resin body 21 to a standard position on an upper surface of each of the optical waveguides 4. The butting portion 25 is constructed in a manner that it covers space between each of the resin body 21 and each of the optical waveguides 4 from an upper side.

The resin body 21 is formed on the substrate 2 and a luminous flux 11 fed from the light source 1 being placed in an upper portion of the substrate 2 is incident on the resin body 21 and a direction of travel of the luminous flux 11 is changed by the plane mirror 23 and finally the luminous flux 11 is refracted at an outgoing surface of the spherical surface 22 to be guided into each of the optical waveguides 4. In the third embodiment, a spread angle of the light condensed by the resin body 21 and entered into each of the optical waveguides 4 is so set as to have a spread angle of light to be transmitted in a two-order or three-order transmission mode approximately as in the case of the first embodiment. Moreover, as shown in FIG. 10, an incident end face of each of the optical waveguides 4 is inclined about 8 degrees relative to a face being vertical to an optical path in the core layer 6 of each of the optical waveguides 4. Then, light is incident into the incident end face of each of the optical waveguides 4 in a manner that a direction of travel of the light is inclined about 12 degrees relative to a direction vertical to the incident end face of each of the optical waveguides 4. An optical axis 17 of the spherical surface 22 of each of the resin body 21 is directed to a direction vertical to the incident end face of each of the plurality of the optical waveguides 4.

FIG. 11 is a diagram illustrating a spherical lens made up of the spherical surface 22 of FIG. 10. Operations of the spherical lens are described in detail by referring to FIG. 11. First, a luminous flux in the resin body 21 travels in parallel to an optical axis of the spherical lens through an optical path being displaced from a position of the optical axis and changes a direction of its travel at a position where a line extending from a center of the spherical lens to the spherical surface 22 in a Y direction at an angle "ϵ" of 22 degrees formed between the optical axis and the line and the optical path intersect so that the light goes out from the resin body 21. A refractive index of the resin body 21 is set to be, for example, 1.5. In this case, the luminous flux emitted from the resin body 21, since it is refracted at a surface of the spherical lens, is output with a lean of about 12 degrees relative to the optical axis of the spherical lens. The luminous flux is fed to an incident end face in each of the optical waveguides 4 and is guided into an optical path in the core layer 6.

Here, a radius of curvature (n) of the spherical lens is 140 $\mu$m and a spherical portion of the spherical lens in which its convex portion is formed with a diameter of 200 $\mu$m in a Y direction is protruded from the resin body 21. In a direction of the substrate 2 (that is, in a Z direction), an intercept having a spherical surface with a width of about 100 $\mu$m is formed. Moreover, a shape of the curved surface of the spherical lens maybe of non-spherical surface type in which aberration of the spherical lens is corrected for. If a distance is set to be about 0.44 mm, as in the case of the first embodiment, a beam diameter of the laser luminous flux has becomes about 50 $\mu$m when it passes through the spherical lens. Then, the laser light having passed through the spherical lens enters into the incident end face of each of the optical waveguides 4.

As described above, since a surface of the resin body 21 on a side of each of the optical waveguides 4 is configured in the form of the spherical surface 22, it is possible to prevent light being reflected off the surface of the resin body 21 from traveling backward to the optical path. Also, by inclining the incident surface of each of the plurality of the optical waveguides 4 being arranged in parallel to one another relative to a face being vertical to the optical axis 17 of each of the optical waveguides 4, prevention of backward travel of light is made possible. At this point, by having light traveling through an optical path being moved in parallel to the optical axis 17 position of the spherical lens being made up of the spherical surface 22 formed on the outgoing surface of the resin body 21 be output, a direction of output of light can be inclined relative to the optical axis. This causes the resin body 21 to output the luminous flux 11 to the plurality of the optical waveguides 4 in same manner and, at the same time, backward travel of light reflected off the incident end face of each of the optical waveguides 4 through the optical light can be avoided.

Thus, according to the third embodiment, almost the same effects as obtained in the first embodiment can be achieved as well. Additionally, it is possible to prevent light being reflected off the incident end face of each of the optical waveguides 4 from traveling backward to the optical path.

Fourth Embodiment

Figure 12:
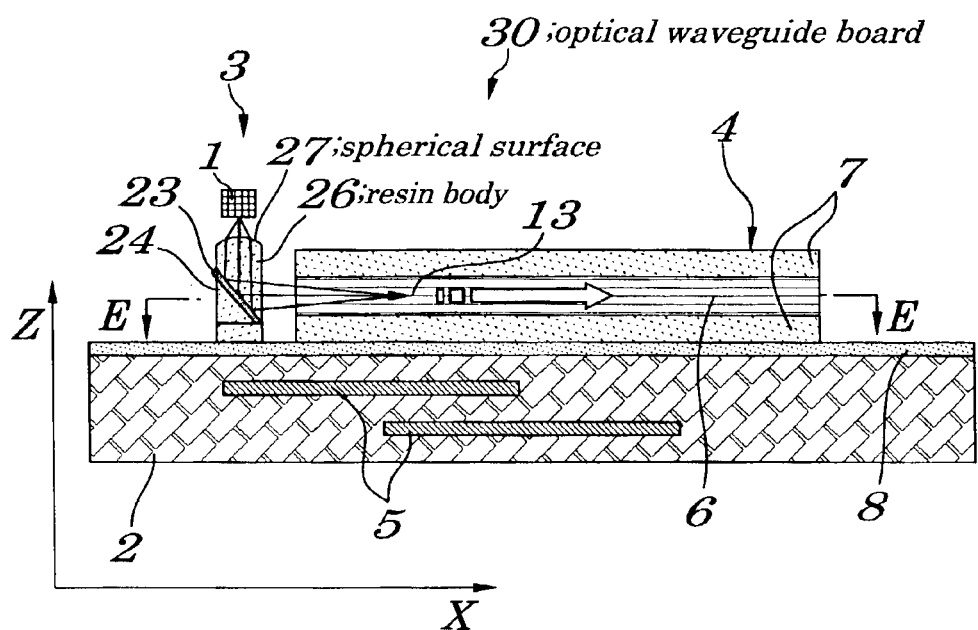
FIG. 12 is a side view showing configurations of an optical module (optical waveguide board) according to a fourth embodiment of the present invention.
Figure 13:
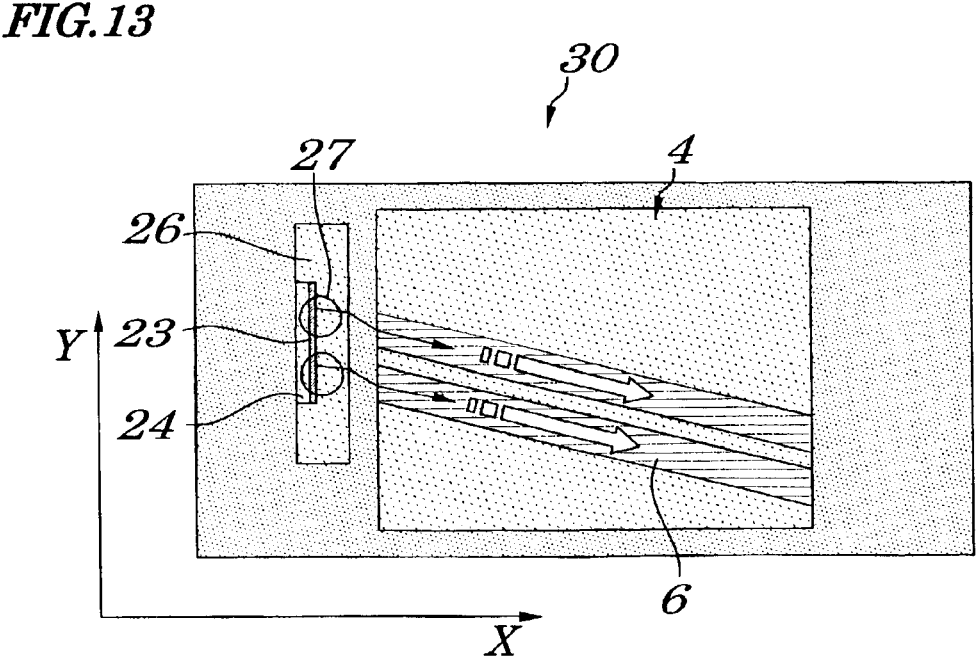
FIG. 13 is a cross-sectional view of the optical waveguide board of FIG. 12 taken along a line E—E.
Figure 14:
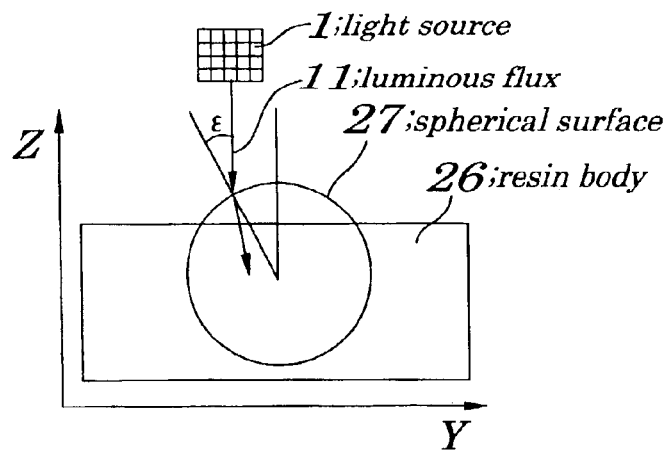
FIG. 14 is a diagram briefly illustrating configurations of a main component of the optical module (optical waveguide board) of the fourth embodiment of the present invention.

FIG. 12 is a side view showing configurations of an optical module (optical waveguide board 38) according to a fourth embodiment of the present invention. FIG. 13 is across-sectional view of the optical waveguide board 30 of FIG. 12 taken along a line E—E. FIG. 14 is a diagram briefly illustrating configurations of a main component of the optical module (optical waveguide board 30) of the fourth embodiment. Configurations of the optical waveguide board 30 of the fourth embodiment differ greatly from those in the first embodiment in that a spherical lens is placed on an upper surface of a resin body 26 and a position where a luminous flux is incident on the spherical lens and, as in the case of the second embodiment, an adhesive having almost same refractive index as that possessed by a core layer 6 in each of optical waveguides 4 can be filled between the resin body and each of the optical waveguides 4.

The optical module (optical waveguide board 30) of the fourth embodiment, as shown in FIG. 12 and FIG. 13, is so configured that a core layer 6 of each of the optical waveguides 4 has a refractive index being higher by about 0.3% than that of its clad layer 7. Moreover, in an optical path changing unit 3, the resin body 26 being placed in a vicinity of each of the optical waveguides 4 is formed and a surface of the resin body 26 is formed so as to have a shape of a plurality of spherical surfaces 27 corresponding to a plurality of the optical waveguides 4 being arranged in parallel to one another. On the resin body 26 is formed a plane mirror 23 adapted to reflect light emitted from a light source 1 and the plane mirror 23 is used as one surface commonly for the plurality of the optical waveguides 4. The spherical surface 27 makes up the spherical lens. The plane mirror 23 is made up of the resin body 26 coated with metal films obtained by a method of evaporation and a surface of the plane mirror 23 is coated with a filling resin 24.

The resin body 26 is formed on a substrate 2 and the luminous flux fed from the light source 1 being placed in an upper portion of the substrate 2 is incident on the resin body 26 and a direction of travel of the luminous flux 11 is changed by the plane mirror 23 and finally the luminous flux 11 is refracted at an outgoing surface of the spherical surface 27 to be guided into each of the optical waveguides 4. A spread angle of the light condensed by the resin body 26 and entered into each of the optical waveguides 4 is so set as to have a spread angle of light to be transmitted in a two-order or three-order transmission mode approximately as in the case of the first embodiment. Moreover, as shown in FIG. 13, an incident end face of each of the optical waveguides 4 is inclined about 8 degrees relative to a face being vertical to an optical path in the core layer 6 of each of the optical waveguides 4. Then, light is incident into the incident end face of each of the optical waveguides 4 in a manner that a direction of travel of the light is inclined about 12 degrees relative to a direction vertical to the incident end face of each of the optical waveguides 4.

FIG. 14 is a diagram illustrating a part of the spherical lens made up of the spherical surface 27 in an Y Z cross section obtained when the resin body 26 of FIG. 13 is seen from a front side. Operations of the spherical lens are described in detail by referring to FIG. 14. First, the luminous flux 11 emitted from a light source 1 is made incident on a portion of the spherical surface 27 being inclined by an angle $\epsilon$ being 24 degrees relative to a plane. A refractive index of the resin body 26 is, for example, 1.5. In this case, the luminous flux 1 is refracted at the spherical surface 27 and travels into the resin body 26 with a lean of about 8.3 degrees in a Y direction relative to a Z axis direction. When the luminous flux 11 is reflected off the plane mirror 23 almost in a vertical direction, the reflected luminous flux 11 travels with a lean of about 8.3 degrees in a Y direction relative to an X axis direction. This luminous flux 11, when being output from an outgoing surface of the resin body 26 to an outside, travels with a lean of about 12.5 degrees in a Y axis direction relative to the X axis direction. This luminous flux 11 is guided into an incident face of each of the optical waveguide 4.

Here, with a radius of curvature (n) of the spherical lens being 140 $\mu$m, a spherical portion in which a convex portion is formed with a diameter of 200 $\mu$m in a Y direction is protruded from the resin body 26. In a direction of the substrate 2 (that is, in a X direction), an intercept having a spherical surface with a width of about 100 $\mu$m is formed. A shape of the curved surface of the spherical lens maybe of non-spherical surface type in which aberration of the spherical lens is corrected for. Moreover, an adhesive having almost same refractive index as that possessed by the core layer 6 in each of the optical waveguides 4 can be filled between the resin body 26 and each of the optical waveguides 4.

As described above, by setting an upper surface of the resin body 26 to the spherical lens made up of the spherical surface 27 and inclining a face on which the luminous flux 11 is incident by about 24 degrees relative to a vertical face in a direction in which the luminous flux 11 is fed from the light source 1, it is possible to prevent the luminous flux 11 reflected off a surface of the resin body 26 from traveling backward to the light source 1.

Thus, in the fourth embodiment, almost the same effects as obtained in the first embodiment can be achieved as well. Additionally, it is possible to prevent light being reflected off the surface of the resin body 26 from traveling backward to the optical path.

Fifth Embodiment

Figure 15:
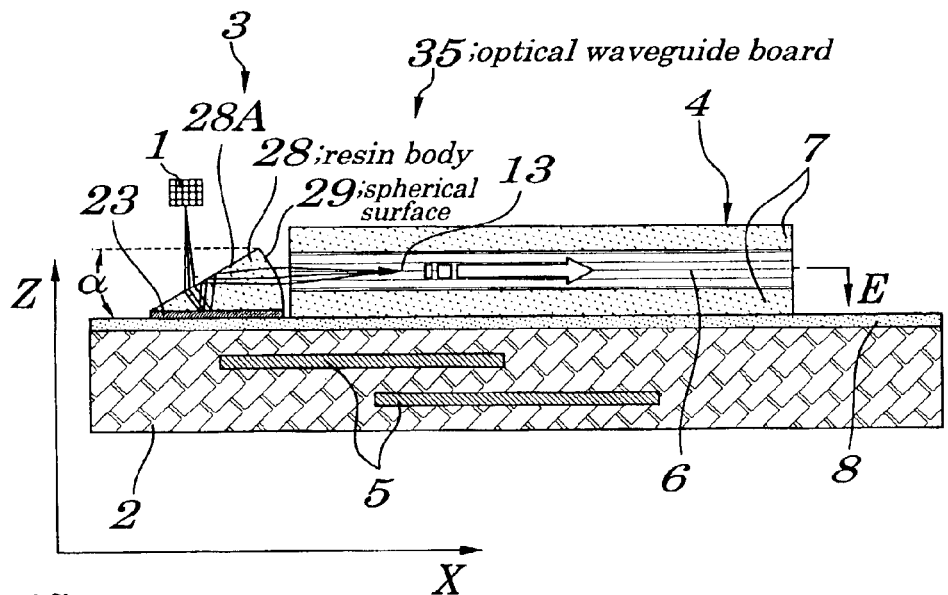
FIG. 15 is a side view showing configurations of an optical module (optical waveguide board) according to a fifth embodiment of the present invention.
Figure 16:
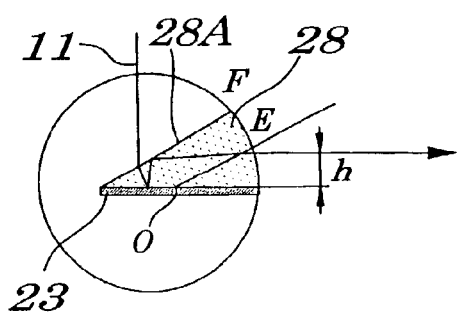
FIG. 16 is a diagram briefly illustrating configurations of a main component of the optical module (optical waveguide board) of the fifth embodiment of the present invention.

FIG. 15 is a side view showing configurations of an optical module (optical waveguide board 35) according to a fifth embodiment of the present invention. FIG. 16 is a diagram briefly illustrating configurations of a main component of the optical module (optical waveguide board 35) of the fifth embodiment. Configurations of the optical waveguide board 35 of the fifth embodiment differ greatly from those in the above first embodiment in that structures of a resin body and a plane mirror 23 are made simplified.

In an optical path changing unit 3 in the optical module (optical waveguide board 35) of the fifth embodiment, as shown in FIG. 15, the resin body 28 is placed in a vicinity of an optical waveguide 4, an upper surface 28A of the resin body 28 is inclined by an angle "$\alpha$" relative to a surface of a substrate 2, the plane mirror 23 adapted to reflect light fed from a light source 1 is formed on an lower surface of the resin body 28, and a spherical lens made up of a spherical surface 29 in which an axis of the lens is inclined relative to the substrate 2 is formed on a light outgoing surface of the resin body 28. By forming such the spherical lens, a contrivance is used in that a surface of the spherical lens is so configured that no overhang exists on the surface of the substrate 2. This is because the resin body 28 can be easily peeled off from a mold (not shown) when the resin body 28 is formed by using the mold.

Angles formed between each surface of the resin body 28 and the surface of the substrate 2 are adjusted so that, when light traveling in a direction being vertical to the surface of the substrate 2 is incident in the resin body 28, (1) the light is refracted at an upper surface 28A of the resin body 28, (2) the light is reflected upward off a mirror surface of the plane mirror 23 being placed on a lower surface of the resin body 28, (3) the light is totally reflected off the upper surface 28A of the resin body 28 and travels toward a side direction, and (4) the light is refracted by the spherical lens made up of the spherical surface 29 and then is output to an outside. The outgoing direction of the light becomes a direction being parallel to the surface of the substrate 2. In the same manner as above, an inclination angle in each face is determined. Moreover, the light is condensed by the spherical lens formed on the light outgoing surface.

FIG. 16 is an expanded diagram of the resin body 28 shown in FIG. 15. Operations of the resin body 28 are described in detail by referring to FIG. 16. Let it be assumed that a refractive index (n) of the resin body 28 is about 1.5 and a radius of curvature (r) of the spherical lens being placed on the light outgoing portion of the resin body 28 is 140 μm. A curvature central point (O) of the spherical surface of the resin body 28 is set on a lower side of the mirror surface of the plane mirror 23. Here, the curvature central point (O) is set to a height being same as that of the mirror surface. A position of light entering into a core layer 6 of the optical waveguide 4 is set to have a height (h) on an upper portion of the mirror surface being about 50 μm. As a result, an angle (α) formed between a line to connect the curvature central point (O) of the spherical surface with a light outgoing point (E) and the surface of the substrate 2 is "arc sin(h/r)=21 degrees (=0.367 rad)". Moreover, an angle (δ) formed between the light beam traveling from an inner portion of the resin body 28 to a light outgoing point (E) and the surface of the substrate 2 is "arc sin(h/r)−arc sin(h/nr)= 7.1". Then, the light beams traveling in parallel to one other and upward and downward within the resin body 28 are focused onto a position of r·cos(δ)/(n−1) and the light beams traveling in parallel to one another and in right and left directions are focused onto a position at other distance outside the resin body 28. These focusing positions are at a distance of about r/(n−1)=280 mm from the resin body 28.

On the other hand, when an angle (β) formed between the incident face of the resin body 28 and the surface of the substrate 2 is given, an angle (δ) formed between the light beam traveling after being reflected off the mirror surface under the resin body 28 and being reflected totally off the upper surface of the resin body 28 is "3β−arc sin(sin β/n)−π/2 (rad)". To obtain a result of "7.1 degrees=0.124 rad", the angle "β" has to be 41 degrees. In the special case where the curvature central point (O) is located on the incident face of the resin body 28, a highest position (F) where the incident face and the spherical surface 29 of the light outgoing portion intersect each other is located in an upward position of the mirror surface with a height of 91 μm. If a distance between the light source 1 and the spherical surface 29 is set to be about 0.44 mm, a laser luminous flux 11 converges in a position being apart about 770 mm from the spherical portion and a beam diameter in the focusing position is reduced to about 18 μm and the same change in the traveling direction of the luminous flux 11 as is achieved in the first embodiment is made possible.

Thus, in the fifth embodiment, almost the same effects as obtained in the first embodiment can be achieved as well. Additionally, according to the fifth embodiment, since structures of the resin body 28 and the plane mirror 23 are simplified, easy manufacturing of the optical waveguide board 35 can be achieved.

Sixth Embodiment

Figure 17:
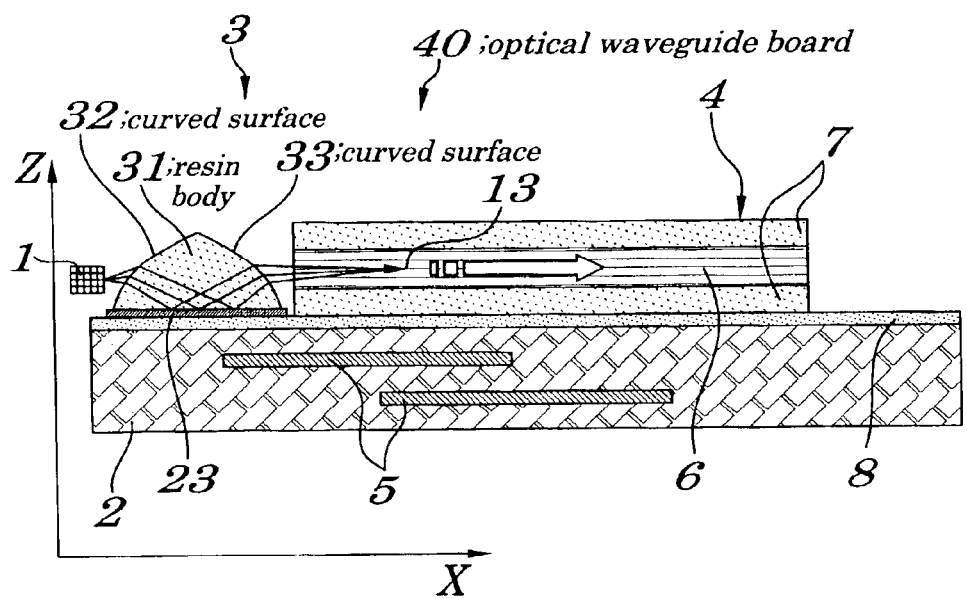
FIG. 17 is a side view showing configurations of an optical module (optical waveguide board) according to a sixth embodiment of the present invention.

FIG. 17 is a side view showing configurations of an optical module (optical waveguide board 40) according to a sixth embodiment of the present invention. Configurations of the optical waveguide board 40 of the sixth embodiment differ greatly from those in the first embodiment in that light beams entering from a light source 1 in parallel to a surface of a substrate 2 can be handled and in that structures of a resin body 31 are simplified.

In an optical path changing unit 3 in the optical module (optical waveguide board 40) of the sixth embodiment, as shown in FIG. 17, the pyramidal resin body 31 is formed in a vicinity of an optical waveguide 4 and curved surfaces 32 and 33 are formed on the resin body 31 respectively on a side of the light source 1 and on a side of the optical waveguide 4. The curved surface 32 receives light from the light source 1 and the curved surface 33 outputs light reflected off a plane mirror 23 being placed under a lower face of the resin body 31 to the optical waveguide 4.

Light fed from the light source 1, after having entered at the curved surface 32, is reflected off the plane mirror 23 and is then refracted by the curved surface 33 and is output as light traveling in parallel to the surface of the substrate 2 and is made incident into the optical waveguide 4. Since such the pyramidal resin body 31 can be easily formed by using a mold or a like, easy fabrication of the optical module (optical waveguide board 40) having a function of condensing light beams is made possible.

Thus, in the sixth embodiment, almost the same effects as obtained in the first embodiment can be achieved as well. Additionally, according to the sixth embodiment, since structures of the resin body 31 are simplified, easy manufacturing of the optical waveguide board 40 is made possible.

Seventh Embodiment

Figure 18:
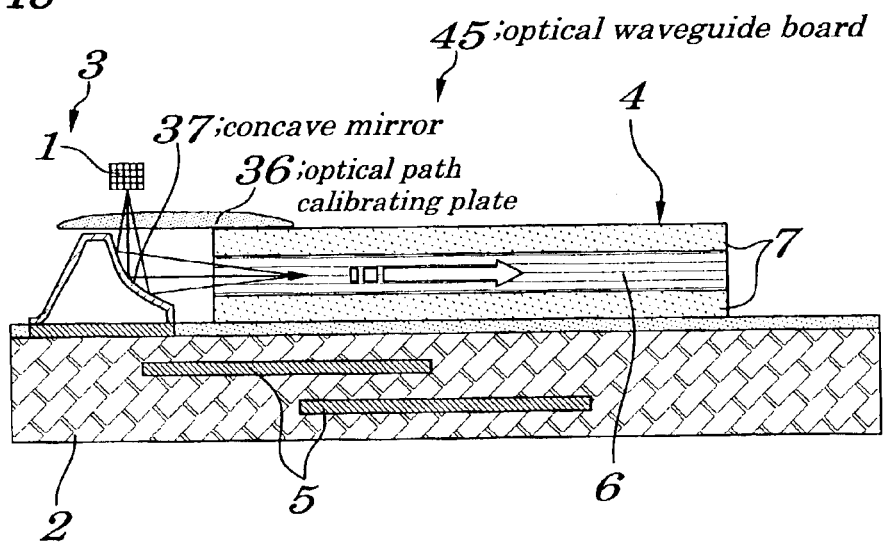
FIG. 18 is a side view showing configurations of an optical module (optical waveguide board) according to a seventh embodiment of the present invention.
Figure 19A:
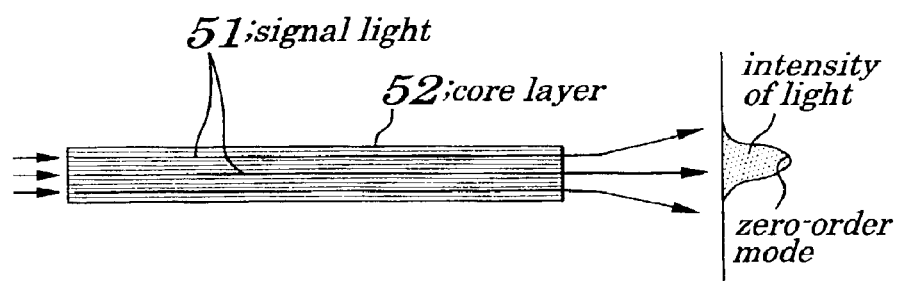
FIGS. 19A and 19B are diagrams explaining disadvantages of a conventional optical waveguide board.
Figure 19B:
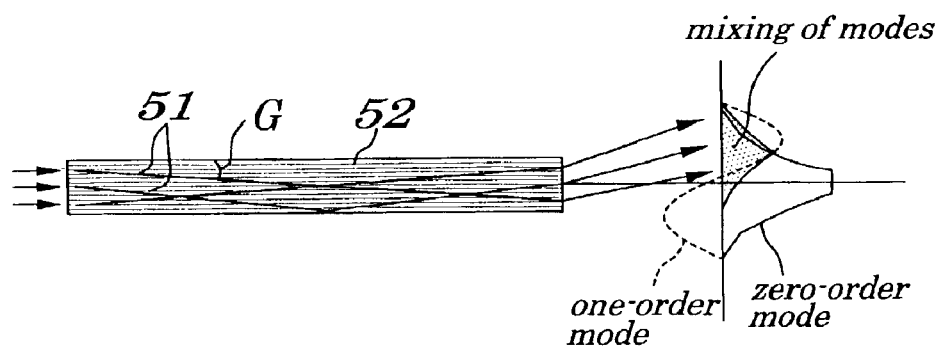

FIG. 18 is a side view showing configurations of an optical module (optical waveguide board 45) according to a seventh embodiment of the present invention. Configurations of the optical waveguide board 45 of the seventh embodiment differ greatly from those in the first embodiment in that an optical path calibrating plate 36 having a focusing distance being sufficiently larger than that of the optical path changing unit 3 that is employed in the above embodiments is placed between a light source 1 and the optical path changing unit 3 and a position of a luminous flux can be finely calibrated by making it possible for a position of the optical path calibrating plate 36 to be moved in parallel to a surface of a substrate 2. In the optical waveguide board 45 of the seventh embodiment, as shown in FIG. 18, between a concave mirror 37 making up the optical changing unit 3 and the light source 1 is provided the optical path calibrating plate 36 being placed in a manner that it can be made movable in parallel to the surface of the substrate 2. The optical path calibrating plate 36 is placed, after the light source 1 is positioned to the substrate 2 being fixed to the concave mirror 37, between the light source 1 and the concave mirror 37.

In the optical path calibrating plate 36, by calibrating amounting position on the substrate 2 in a finer manner, a deviation angle (C) in a light beam entering into an optical waveguide 4 from a direction in which light is transmitted in a zero mode in the optical waveguide 4 can be adjusted to be reduced. Also, by calibrating an incident direction of light to be condensed by the concave mirror 37 toward the optical waveguide 4, the deviation angle (C) is adjusted to be reduced. Moreover, by reducing a spread angle of light being incident into the optical waveguide 4, a number of modes for transmission of light being incident into the optical waveguide 4 can be decreased.

The optical path calibrating plate 36 having a radius of curvature on one spherical surface being about 1.4 mm is made up of a convex portion whose diameter is about 400 μm and whose thickness is about 14 μm and is constructed so as to be of a convex lens. A focusing distance of the convex lens is about 2.8 mm, while a focusing distance of the concave mirror 37 is about 0.27 mm which is the same as in the first embodiment. Therefore, the focusing distance of the convex lens is about 10 times larger than that of the concave mirror 37. As a result, by moving the optical waveguide plate 36 on a surface of the optical waveguide 4 to adjust its position, a direction of a luminous flux entering into the core layer 6 of the optical waveguide 4 can be finely adjusted, thereby enabling a deviation from an incident direction to the optical waveguide 4 to be reduced. After having calibrated the optical path finely, the optical calibrating plate 36 is fixed to the substrate 2. Moreover, even in the case of the optical waveguide 4 for single-mode transmission in which a diameter of a cross-sectional face of a pattern is 7 μm, by adjusting a direction of the luminous flux using the optical calibrating plate 36, the luminous flux can be positioned to a cross-sectional face of the pattern of the core layer 6.

Thus, in the seventh embodiment, almost the same effects as obtained in the first embodiment can be achieved as well. Additionally, according to the seventh embodiment, since the optical path can be finely adjusted by using the optical path calibrating plate 36 to calibrate a direction of the optical path, the luminous flux can be guided exactly to the core layer 6 of the optical waveguide and therefore the optical waveguide 4 board 45b is effectively used not only for the optical waveguide 4 for multi-mode transmission but also for the optical waveguide 4 for single-mode transmission.

It is apparent that the present invention is not limited to the above embodiments but may be changed and modified without departing from the scope and spirit of the invention. For example, in the above embodiments, the optical path changing unit 3 and the optical waveguide 4 are formed on the substrate 2, however, they can be embedded within the substrate 2. Moreover, it is not always necessary that wiring patterns are formed within the substrate 2. Moreover, in the above embodiments, the optical path changing unit 3 is made up of the resin body. However, so long as a material has optical transmittance, not only the resin body but also insulating materials can be used.

What is claimed is:

1. An optical waveguide board comprising:
    a substrate;
    an optical path changing unit being formed on said substrate used to change a direction of an optical path of incident light from a direction being vertical to a surface of said substrate to a direction being horizontal to said surface of said substrate and to condense a luminous flux;
    an optical waveguide being formed on said substrate used to carry out multi-mode transmission of said luminous flux fed from said optical path changing unit; and
    wherein, based on a spread angle of said luminous flux formed by said optical path changing unit, mainly light components to be transmitted in a zero-order mode to a three-order mode only, out of various kinds of modes for said multi-mode transmission, is transmitted through said optical waveguide.

2. The optical waveguide board according to claim 1, wherein said optical path changing unit is constructed of an insulator having a surface of a spheroid and on said surface of said spheroid is formed a concave mirror made up of a metal film.

3. The optical waveguide board according to claim 1 or claim 2, wherein an adhesive is filled between said optical path changing unit and said optical waveguide.

4. The optical waveguide board according to claim 3, wherein said adhesive has almost a same refractive index as that of a core layer making up said optical waveguide.

5. The optical waveguide board according to claim 1, wherein
    said optical path changing unit is made up of an insulator and
    on a surface of said insulator on a side of said optical waveguide is formed a plurality of spherical surfaces corresponding to a plurality of said optical waveguides being placed in parallel to one another.

6. The optical waveguide board according to claim 1, wherein
    said optical path changing unit is made up of an insulator and
    on an upper surface of said insulator is formed a plurality of spherical surfaces corresponding to a plurality of said optical waveguides being placed in parallel to one another.

7. The optical waveguide board according to claim 1, wherein
    said optical path changing unit is made up of an insulator and
    an upper surface of said insulator is arranged in a manner so as to be inclined relative to said substrate and wherein a spherical surface is formed on a light outgoing surface of said insulator.

8. The optical waveguide board according to claim 1, wherein
    said optical path changing unit is made up of an insulator and
    on a side of said light source of said insulator is formed a first curved surface on which light is incident from said light source and on a side of said optical waveguide of said insulator is formed a second curved surface used to output light reflected on a plane mirror existing under a lower surface of said insulator, so that the output light enters into said optical waveguide.

9. An optical waveguide board comprising:
    a multi-mode optical waveguide formed on a substrate used to receive and transmit light
    wherein, when an angle of deviation of an optical path entering into said multi-mode optical waveguide is a spread half angle of light to be transmitted in a zero-order mode,
    a luminous flux fed from said optical path is formed by a light condensing unit so as to have a spread half angle being about two times or more larger than said angle of deviation of said optical path and
    said spread half angle of said luminous flux is set to be less than about 2.4 degrees.

10. An optical waveguide board comprising:
    a plurality of light sources which emit a plurality of luminous fluxes in a first direction;

a light condensing unit; and an optical waveguide, disposed within a surface of a substrate, comprising a plurality of optical waveguide components and defining an optical path;

wherein said optical waveguide further comprises an incident surface inclined with respect to said optical path defined by said optical waveguide; and wherein the plurality of luminous fluxes emitted by said plurality of light sources are incident on said incident on said light condensing unit, are reflected and condensed by said light condensing unit, are emitted from said light condensing unit in a second direction substantially perpendicular to said first direction, and are incident on said incident surface of said optical waveguide.

11. The optical waveguide board according to claim 10, wherein said light condensing unit comprises:

an insulator having an upper surface, a lower surface, and a convex surface; and a mirror, disposed under said lower surface of said insulator;

wherein light incident on the upper surface is refracted at said upper surface of said insulator and directed to said mirror, is reflected off said mirror and redirected to said upper surface of said insulator, is reflected at said upper surface of said insulator and directed to the convex surface, and is condensed and transmitted through said convex surface of said insulator.

12. The optical waveguide board according to claim 10, wherein said light condensing unit has a function of having a light beam in said optical path travel toward a direction of an optical axis of said optical waveguide.

13. An optical module comprising:

a light source and an optical waveguide board comprising:

a substrate;

an optical path changing unit being formed on said substrate used to change a direction of an optical path of incident light from a direction being vertical to a surface of said substrate to a direction being horizontal to said surface of said substrate and to condense a luminous flux;

an optical waveguide being formed on said substrate to carry out multi-mode transmission of said luminous flux fed from said optical path changing unit; and wherein, based on a spread angle of said luminous flux formed by said optical path changing unit, mainly light components to be transmitted in a zero-order mode to a three-order mode only, out of various kinds of modes for said multi-mode transmission, is transmitted through said optical waveguide.

14. An optical module comprising:

a light source made up of a surface light emitting device used to deflect a luminous flux in a specified direction, and an optical waveguide board wherein a multi-mode optical waveguide used to receive and transmit light fed from said light source is formed on a substrate and, when an angle of deviation of an optical path entering into said optical waveguide is a spread half angle of light to be transmitted in a zero-order mode, a luminous flux fed from said optical path is formed by a light condensing unit so as to have a spread half angle being about two times or more larger than said angle of deviation of said optical path and said spread half angle of said luminous flux is set to be less than about 2.4 degrees and wherein calibration is made by said light condensing unit so that an angular deviation in said optical path of a luminous flux entering into said optical waveguide relative to a direction in which light is transmitted in a zero-order mode in said optical waveguide is made smaller.

15. An optical module comprising:

a light source and an optical waveguide board wherein a multi-mode optical waveguide used to receive and transmit light fed from said light source is formed on a substrate and, when an angle of deviation of an optical path entering into said optical waveguide is a spread half angle of light to be transmitted in a zero mode, a luminous flux fed from said optical path is formed by a light condensing unit so as to have a spread half angle being about two times or more larger than said angle of deviation of said optical path and said spread half angle of said luminous flux is set to be less than 2.4 degrees and wherein an optical path calibrating unit having a focusing distance being larger than that being used when an optical path is made smaller by said light condensing unit is placed between said light source and said light condensing unit and said optical path calibrating unit is so configured as to be movable in parallel to a surface of said optical waveguide board and wherein calibration is made by said light condensing unit so that an angular deviation in said optical path of a luminous flux entering into said optical waveguide relative to a direction in which light is transmitted in a zero-order mode in said optical waveguide is made smaller.

16. An optical module comprising:

a plurality of light sources;

an optical waveguide board on which the plurality of light sources is mounted;

an optical waveguide, disposed within a surface of a substrate, comprising a plurality of optical waveguide components and defining an optical path a light condensing unit comprising an incident surface inclined with respect to said optical path defined by said optical waveguide;

wherein a plurality of luminous fluxes incident from said plurality of light sources in a first direction are incident on said incident surface of said light condensing unit, are reflected and condensed by said light condensing unit, are emitted from said light condensing unit in a second direction substantially perpendicular to said first direction, and are incident on the optical waveguide.

* * * * *